United States Patent
Ruijter

(10) Patent No.: US 9,759,187 B2
(45) Date of Patent: Sep. 12, 2017

(54) WIND TURBINE HAVING EXTERNAL GLUING FLANGES NEAR FLAT BACK PANEL

(71) Applicant: Envision Energy (Denmark) ApS, Silkeborg (DK)

(72) Inventor: Wout Ruijter, Ulfborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 225 days.

(21) Appl. No.: 14/435,840

(22) PCT Filed: Oct. 7, 2013

(86) PCT No.: PCT/DK2013/050316
§ 371 (c)(1),
(2) Date: Apr. 15, 2015

(87) PCT Pub. No.: WO2014/059989
PCT Pub. Date: Apr. 24, 2014

(65) Prior Publication Data
US 2015/0267681 A1  Sep. 24, 2015

(30) Foreign Application Priority Data

Oct. 16, 2012 (DK) .............................. 2012 70630

(51) Int. Cl.
*F03D 1/06* (2006.01)
*F03D 13/20* (2016.01)
(Continued)

(52) U.S. Cl.
CPC ......... *F03D 1/0683* (2013.01); *F03D 1/0675* (2013.01); *F03D 1/0691* (2013.01);
(Continued)

(58) Field of Classification Search
CPC ........ F03D 1/0683; F03D 13/20; F03D 1/001; F03D 1/0675; F03D 1/0691; B29C 65/48;
(Continued)

(56) References Cited

U.S. PATENT DOCUMENTS

2006/0188378 A1* 8/2006 Bech ................... B29C 66/1312
416/227 R
2008/0219851 A1* 9/2008 Althoff ................. F03D 1/0675
416/226
(Continued)

FOREIGN PATENT DOCUMENTS

EP  1 695 813 A1  8/2006
EP  2 341 241 A1  7/2011
(Continued)

*Primary Examiner* — Dwayne J White
*Assistant Examiner* — Aaron R Eastman
(74) *Attorney, Agent, or Firm* — James Creighton Wray; Meera P. Narasimhan

(57) ABSTRACT

A wind turbine with a wind turbine tower, a nacelle on the tower, a rotor hub rotatably mounted to the nacelle, and at least one wind turbine blade having a blade root mounted to the rotor hub, a tip end, a pressure side and a suction side connected to each other via a leading edge and a trailing edge, a first shell part having inner and outer surfaces and a second shell part having inner and outer surfaces, the shell parts having flanges that extend outwards from the trailing edge of the shell parts and away from the outer surface with gluing surfaces which are glued together when the two shell parts are placed on top of each other. This allows the glue line to be moved out of the inner area defined by the shell parts so that the glue process can be controlled more effectively.

10 Claims, 4 Drawing Sheets

(51) Int. Cl.
  *F03D 13/10* (2016.01)
  *B29C 65/48* (2006.01)
  *B29C 65/00* (2006.01)
  *B29C 65/50* (2006.01)
  *B29L 31/08* (2006.01)

(52) U.S. Cl.
  CPC ............ *F03D 13/10* (2016.05); *F03D 13/20* (2016.05); *B29C 65/48* (2013.01); *B29C 65/483* (2013.01); *B29C 65/5057* (2013.01); *B29C 66/1122* (2013.01); *B29C 66/1312* (2013.01); *B29C 66/54* (2013.01); *B29C 66/543* (2013.01); *B29C 66/7212* (2013.01); *B29L 2031/085* (2013.01); *Y02E 10/721* (2013.01); *Y02P 70/523* (2015.11)

(58) Field of Classification Search
  CPC ............ B29C 65/483; B29C 65/5057; B29C 66/1122; B29C 66/1312; B29C 66/54; B29C 66/543; B29C 66/7212
  USPC .......................................... 416/235
  See application file for complete search history.

(56) References Cited

U.S. PATENT DOCUMENTS

| | | | |
|---|---|---|---|
| 2009/0028704 A1* | 1/2009 | Rebsdorf | F03D 1/0641 416/23 |
| 2010/0003141 A1* | 1/2010 | Hancock | B29D 99/0028 416/223 R |
| 2010/0296940 A1* | 11/2010 | Zuteck | F03D 1/0675 416/226 |
| 2011/0142668 A1* | 6/2011 | Rao | F03D 1/0675 416/229 R |
| 2011/0200444 A1* | 8/2011 | Garcia | F03D 1/0683 416/223 R |
| 2011/0229332 A1* | 9/2011 | Fischer | F03D 1/0641 416/223 R |
| 2011/0254189 A1* | 10/2011 | Doyle | B28B 7/346 264/101 |
| 2013/0170991 A1 | 7/2013 | Olesen | |

FOREIGN PATENT DOCUMENTS

| | | |
|---|---|---|
| EP | 2 468 470 A1 | 6/2012 |
| GB | 2481842 A | 1/2012 |
| WO | 2012/019610 A1 | 2/2012 |

* cited by examiner

WIND TURBINE HAVING EXTERNAL GLUING FLANGES NEAR FLAT BACK PANEL

BACKGROUND OF THE INVENTION

Field of the Invention

The present invention relates a wind turbine comprising:
a wind turbine tower;
a nacelle provided on the wind turbine tower;
a rotor hub rotatably mounted to the nacelle;
one or more wind turbine blades having a tip end and a blade root, where the wind turbine blade further comprises a pressure side and a suction side connected to each other via a leading edge and a trailing edge, wherein the wind turbine blade comprises a first shell part having an inner surface and an outer surface and a second shell part having an inner surface and an outer surface, where the first shell part comprises a first flange having a first gluing surface, and the second shell part comprises a second gluing surface facing the first gluing surface, and where the two gluing surfaces are configured to be glued together using a glue when the two shell parts are placed on top of each other.

Description of Related Art

In recent years, the size and power of wind turbines has increased along with the efficiency of the wind turbines. At the same time, the wind turbine blades have increased in size and length and the aerodynamic design has also changed. The wind turbine blade has an airfoil shaped cross-sectional profile where the sizes of the airfoil shaped profiles decrease towards the tip of the wind turbine blade. The wind turbine blade is at the other end configured to be connected to a wind turbine rotor hub where this end typically has a circular cross-sectional profile and a reinforced structure.

Wind turbine blades comprise a sandwich structure having two shell parts glued together along two glue lines typically located in the leading edge and the trailing edge. UK Patent Application GB 2481842 A and corresponding U.S. Patent Application Publication 2013/0170991 disclose such a structure. The structure of the two shell parts is typically reinforced using a number of support elements in the form of shear webs, box beams or other support elements to which the two shell parts may be glued. The shear webs may be placed on spar caps integrated into the shell parts. The support elements may be arranged along the cross-sectional profiles and/or along the length of the wind turbine blade. The two shell parts are typically formed in two separate molds where the support elements are then arranged in one of the molds. The other mold is then placed on top of the other mold after which the shell parts are glued together using an adhesive. The disadvantage of this configuration is that the glue lines form weak points in the structure which may crack or break due to dynamic loads, such as twisting and flapwise/edgewise bending. This could cause the two shell parts to separate and even break off during operation.

The problem with delamination may solved as disclosed in UK Patent Application GB 2481842 A and corresponding U.S. Patent Application Publication 2013/0170991 by arranging a temperature sensor in the glue line before sandwiching the two shell parts together. The sensor may be an optical fiber extending along the entire length of the glue line and is used for controlling the curing process and detecting any de-bonding in the glue lines. The two shell parts form an acute angle relative to each other at the trailing edge, thereby forming a narrow gluing area at the edge to which the glue may be applied. Although the curing process can be improved using the temperature sensor, the structure of the shell parts at the gluing region remains the same. This means that the glue lines still form weak points which are likely to crack or break during operation.

The trailing edge may be configured as a flat back forming a virtual trailing edge where the glue lines are located in the flat back instead of being configured as a sharp trailing edge. Each of the shell parts typically comprises one half of a flat back panel where two halves are glued together using a gluing flange connected to each of the two halves and which extends inwards towards the support elements. This configuration allows the wind turbine blade to have a thicker cross-sectional profile with increased structural strength and higher lift performance as compared to a wind turbine blade with actual trailing edge having the same chord. However, the glue lines still form weak points in the structure which may crack or break to the dynamic loads. This may particularly occur in the transition area where the trailing edge changes from a truncated profile to a thin outwards extending profile, since the gluing surfaces change configuration inside the cross-sectional profiles. In this transition area the inwards extending gluing flange has to be faced out in order ensure a smooth transition to the gluing surfaces on the inner surface of the shell parts.

European Patent Application EP 2341241 A1 and corresponding U.S. Patent Application Publication 2011/0200444 disclose a wind turbine blade having a flat back arranged at the trailing edge. One of the two shells forming the wind turbine blade comprises an L-shaped flange extending outwards from the inner surface of the suction/pressure side and towards the other shell. The free end of the L-shaped flange extends inwards towards the support elements inside the profile where a corresponding inner surface of the other shell is glued to the free end using an adhesive. In another embodiment the lower shell comprises a gluing flange which extends outwards from the inner surface and tilts inwards towards the support elements. The upper shell comprises a flat back panel which extends outwards and away from the inner surface where the inner surface of the flat back panel is glued to the gluing flange of the lower shell. These embodiments both describe a gluing flange which extends inwards along the inner surface; this means that the gluing flange cannot be formed in the same manufacturing step as the shell, since it cannot be pulled out of the mold together with the shell. In order to form the gluing flange, additional manufacturing steps are required for adding the flange to the shell. The gluing process cannot be controlled in a very effective manner, since the inwards extending flange relays on its own strength during the assembly process. This means that there is an increased risk that the gluing flange would bend or flex during the process which in turns means that less pressure can be applied to the gluing surfaces when the two shells are squished together.

International Patent Application Publication WO 2012/019610 A1 and corresponding U.S. Patent Application Publication 2013/0239379 also disclose gluing flanges extending inwards towards the support elements of the blade. The gluing flanges are located on a separate flat back profile that is glued to the trailing edge of the two shell parts in an additional manufacturing step. A positioning device must be used to keep this profile in its position during the assembly process. The positioning device uses clamps or vacuum to hold the flat back profile in place. This adds to the total manufacturing process and increases the complexity and production costs. The inwards extending flanges relay on their own structural strength to ensure a close contact with the shell parts which means that they are likely to flex or bend during assembly and thereby increasing the risk of de-bonding.

SUMMARY OF THE INVENTION

An object of this invention is to provide a wind turbine blade with a glue line arrangement which is less sensitive to loads and stresses generated in the wind turbine blade.

An object of this invention is to provide a wind turbine blade with a glue line arrangement which can be quickly and easily inspected.

An object of this invention is to provide a wind turbine blade where the gluing flanges can be manufactured in the same manufacturing step as the two shell parts forming the wind turbine blade.

An object of this invention is to provide a simpler and easier assembly process for the two shell parts forming the wind turbine blade.

An object of the invention is achieved by a wind turbine having a wind turbine blade characterised in that:
- the first flange is arranged at the trailing edge of the first shell part and extends outwards and away from the outer surface of the first shell part, and
- a second flange is arranged at the trailing edge of the second shell part and extends outwards and away from the outer surface of the second shell part, wherein the two flanges form two substantially parallel gluing surfaces and a flap configured to enhance the aerodynamic properties of the wind turbine blade.

This configuration allows the glue line defined by the first and second gluing surfaces to be moved out of the inner area defined by the two shell parts so that the gluing process can be controlled more effectively and thereby providing a simpler and easier assembly process of the two shells which in turn reduces the overall production costs. This configuration allows for a quicker and easier inspection of the glue line, since the inspection can be carried out from the outside of the wind turbine blade either visually or by the use of a measuring or inspection device. By arranging the flanges on the outer surface of the wind turbine blade, the two flanges can be supported by the molds of the shell parts during the assembly process, instead of relying on their own strength. This enables the two shell parts to be pressed together more effectively, since a higher pressure can be applied to the gluing surfaces, e.g., by use of the two molds. This provides a better and more effective way of eliminating air from the glue line. After the gluing process any excess material or glue may be ground off. The two flanges form a flap, e.g., a Gurney flap, which enhances the aerodynamic properties, i.e., increases the aerodynamic lift, of the wind turbine blade. This configuration allows the two flanges to have the same shape and configuration along the entire length of the wind turbine blade.

The two flanges may form two substantially parallel gluing surfaces which extend outwards from the trailing edge in a direction towards the pressure or suction side. This provides a substantially large surface area for the glue or adhesive to adhere to; thus increasing the strength of the glue lines and thereby reducing the risk of de-bonding. The flanges may have a planar shape or be shaped to substantially follow the curvature of the pressure or suction side.

According to one embodiment, the first shell part comprises a flat back panel connected to the first flange and the first shell part.

This allows the flat back panel to have a planar or curved outer surface which rounds off the trailing edge of the wind turbine blade, which enables the flat back panel to function as a flat back or truncated trailing edge for the cross-sectional profiles of the wind turbine blade. The flat back panel extends from a first point at or near the blade root to a second point located a distance from the tip end. The glue line and thus the two flanges may be located at the pressure side extending at least along the flat back panel. The flanges may at least extend from the first point to the second point. This configuration allows the thickness and structural strength of the cross-sectional profile to be increased. This also allows the chord to be reduced while maintaining the same lift performance.

According to a particular embodiment, the flat back panel is configured as a flange having a radius curved outer surface curving inwards towards the leading edge.

This allows the connection between the outer surface of the flat back panel and the outer surface of the first shell part to be formed as an outwardly extending edge having a curved or rounded shape. The edge may instead form a well defined substantially sharp edge. As the height of the flat back panel decreases towards the tip end, the shape of the edge may change from a smooth edge to a continuous transition between the two surfaces. The connection between the outer surface of the flat back panel and the outer surface of the first flange may be formed as a smooth edge or a continuous transition between the two flanges. The radius or radii of curvature along the length of the flat back panel may be constant or decrease/increase towards the blade root. The flat back panel may near the blade root follow the curvature of the blade root. This allows the shell to be pulled out of the mold more easily and provides an easier lay-up of the laminate forming the shell part. If the wind turbine is twisted towards the blade root, the flat back panel follows the twist of the wind turbine blade.

According to another particular embodiment, the flat back panel is configured as a flange having a radius curved outer surface curving outwardly away from the leading edge.

This allows the connection between the outer surface of flat back panel and the outer surface of the first shell part to be formed as an outwards extending edge having a rounded or smooth shape which in turns allows for a more laminar air flow over the edge. This also allows the shell part to be pulled out of the mold more easily and provides an easier lay-up of the laminate forming the shell part. The connection between the outer surface of the flat back panel and the outer surface of the first flange may likewise be formed as a smooth edge or a continuous transition between the two flanges.

According to one embodiment, the first flange is placed in an angle of 90° or more relative to the tangent of the outer surface or the inner surface of the first shell part or the flat back panel.

The first flange is positioned in a "positive angle" (90° or more) relative to the inner or outer surface of the first shell part. This allows the first flange to be manufactured in the same manufacturing step as the first shell part, since the first flange does not extend back over the surface of the first shell part (sometimes referred to as a "negative angle"). This enables the first flange to be formed in the same mold as the first shell part so that it forms part of the first shell part. This reduces the number of manufacturing steps required to provide a gluing surface for the second shell part. If the first flange is connected to the flat back panel, the first flange may form part of the flat back panel.

According to a particular embodiment, the flat back panel is placed in an angle of 90° or more relative to the tangent of the outer surface or inner surface of the first shell part.

This allows the flat back panel to be manufactured in the same manufacturing step as the first shell part and the first flange so that both the flat back panel and the first flange form part of the first shell part. Thus reducing the total number of manufacturing steps required to prepare and glue the two shell parts together. Since neither the flat back panel nor the first flange extend back over the previous surface (form a "negative angle"), the two flanges may be formed in the same mold as the first shell part and pulled out of the mold together with the first shell part.

According to one embodiment, the second flange is placed in an angle of 90° or more relative to the tangent of the outer or inner surface of the second shell part.

The second flange is positioned in a "positive angle" relative to the inner or outer surface of the second shell part. This allows the second flange to be manufactured in the same manufacturing step as the second shell part, since the second flange does not extend back over the surface of the second shell part (form a "negative angle"). Like the first flange, this enables the second flange to be formed in the same mold as the second shell part so that it forms part of the second shell part and enables it to be pulled out of the mold together with the second shell part. This eliminates the step of providing a gluing surface in the inner surface of the second shell part after it has been taken out of the mold.

According to one embodiment, the glue has a high viscosity.

The adhesive used to bond or glue the two shell parts together may be a glue suitable for a bonding process and not an infusion process, such as the resin used to infuse the layers of material used in the shell parts. The adhesive may be an epoxy having a high viscosity, e.g., a two component epoxy glue or a polyurethane. The adhesive may also be an adhesive tape having an adhesive layer suitable to be used in a wind turbine blade.

According to one embodiment, a third gluing surface and a fourth gluing surface is arranged at or near the leading edge on the first and second shell parts respectively.

This allows the leading edges of the shell parts to be glued together along a glue line arranged outside or inside the two shell parts. The second shell part may comprise an inwards extending glue flange having a gluing surface facing the inner surface of the first shell part. The first shell part comprises a gluing surface configured to be glued to the gluing surface on the flange. The first shell part may comprise a second flange on which the gluing surface is located.

In a particular embodiment, the flat back panel may be configured to form part of the second shell part instead of the first shell part and extend outwards and away from the inner surface of the second shell part. The flat back panel may be arranged between the outer surfaces of the second shell part and the second flange The first flange may be connected to and extend outwards and away from the outer surface of the first shell part. The flanges may form a flap extending in a direction towards to the suction side or substantially follow the curvature of the suction side.

According to one embodiment, the first and second flanges have a width of 2-10%, preferably 5%, relative to the chord of the wind turbine blade.

This allows the first and second flanges to form a sufficiently large gluing surface for the gluing process so that a strong connection between the two shell parts is achieved. This enables the gluing line to absorb and/or distribute at least some of the forces/loads generated in the two shells parts. The width allows the flanges to form a sufficiently large flap capable of the improving the aerodynamic lift of the wind turbine blade. The width of the first and second flanges may be defined relative to the maximum chord of the wind turbine blade or as function of the chord along the length of the wind turbine blade.

The flanges may have a width of at least 2 cm at least between the first and second point defining the flat back panel or along a longer span-wise portion of the wind turbine blade. The width may be between 2-15 cm or 2-10 cm or 2-5 cm. The flanges may have a constant width between these two points which then gradually decreases towards the tip end and/or the blade root.

The wind turbine blade may be configured as at least one of the blade sections of a partial pitch wind turbine blade which comprises two or more blade sections where at least one of the blade sections is configured to be pitched relative to at least one of the other blade sections. The wind turbine blade may also be configured as at least one of the blade sections of a modular wind turbine blade which comprises two or more blade sections configured to be mounted together. If the wind turbine blade is configured as an inner blade section, the tip end may instead form an outer blade end configured to be mounted to another blade section and/or a pitching system arranged between the blade sections. If the wind turbine blade is configured as an intermediate blade section, the blade root and the tip end may instead form inner and outer blade ends configured to be mounted to another blade section and/or the pitching system. If the wind turbine blade is configured as an outer blade section, the blade root may instead form an inner blade end configured to be mounted to another blade section and/or the pitching system. The wind turbine blade may also be configured as a traditional wind turbine blade made of a single section extending from blade root to tip end.

In another particular embodiment, one or more controllable flaps may be arranged in front of the outer surface of the flat back panel and/or along the trailing edge. The flaps may be rotatably or pivotally mounted to the wind turbine blade. The flaps may be connected to a control unit configured to at least control the rotation or pitch of the flaps. The flaps may be arranged in one or more recesses formed in the trailing edge of the wind turbine blade. Alternatively, the flanges may be configured to form a flexible flap configured to rotate or pitch relative to the wind turbine blade using rotation or pitching means arranged inside the wind turbine blade.

The invention is described by example only and with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
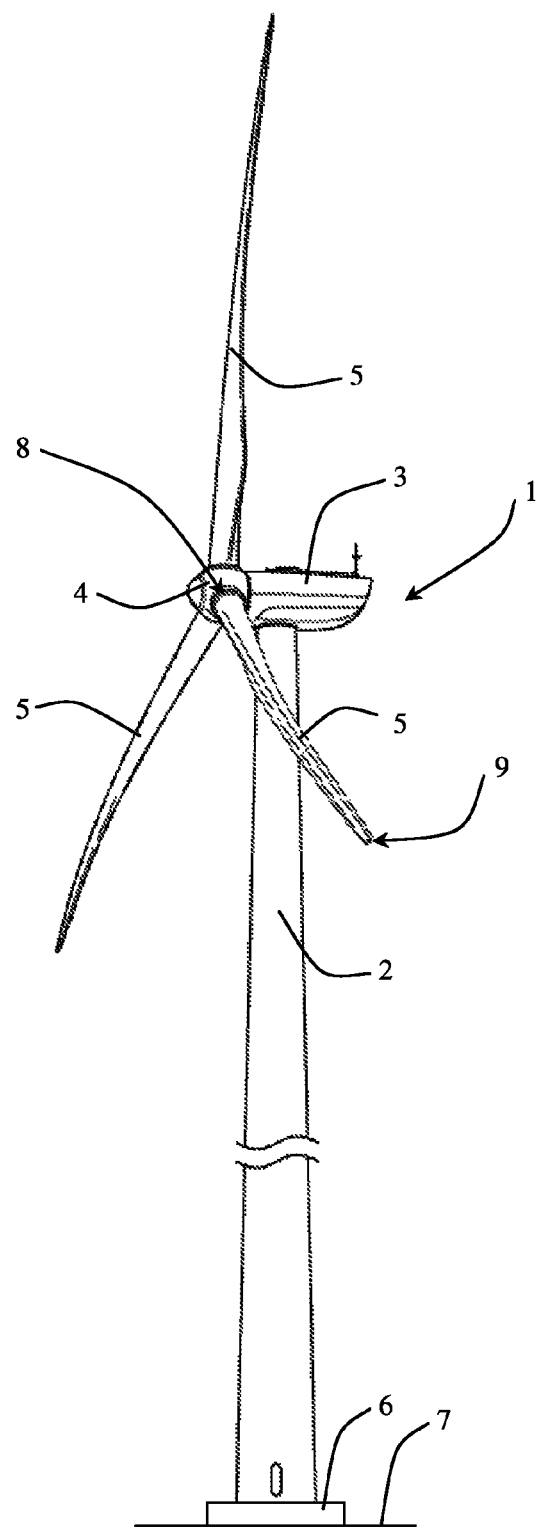
FIG. 1 shows an exemplary embodiment of a wind turbine.

FIG. 1 shows an exemplary embodiment of a wind turbine 1 comprising a wind turbine tower 2 and a nacelle 3 mounted at top of the wind turbine tower 2. The wind turbine tower 2 may comprise one or more tower sections mounted on top of each other. A rotor hub 4 may be rotatably mounted to the nacelle 3 via a rotor shaft. One or more wind turbine blades 5 may be mounted to the rotor hub 4 via a shaft extending outwards from the center of the rotor hub. Two or three wind turbine blades 5 may be mounted to the rotor hub 4 where the wind turbine blades 5 form a rotation plane. The wind turbine tower 2 may be mounted onto a foundation 6 extending above a ground level 7.

The wind turbine blade 5 may comprise a blade root 8 configured to be mounted to the rotor hub 4. The wind turbine blade 5 may comprise a tip end 9 arranged at the free end of the blade 5. The wind turbine blade 5 has an aerodynamic profile along the length of the blade. The wind turbine blade 12 may be made of fiber reinforced plastics or composites, e.g., having fibers made of glass, carbon or organic fibers, which form a laminate. The laminate may be infused using a resin, e.g., epoxy, supplied by an external system, e.g., a vacuum infusion system.

The blade root 15 may comprise a plurality of connecting elements (not shown) arranged near the periphery of the blade root 15. The connecting elements may be configured to be mounted to a plurality of receiving connecting elements, e.g., holes, arranged in the rotor hub 11. The connecting elements may be configured as T-bolts or studs which are configured to be mounted to or glued into the blade root 15. Alternatively, the T-bolts or studs may be arranged in the rotor hub 11 instead. The use of T-bolts allows for an easy mounting to the rotor hub 11 and the T-bolts have a high reliability for static and fatigue loads.

Figure 2:
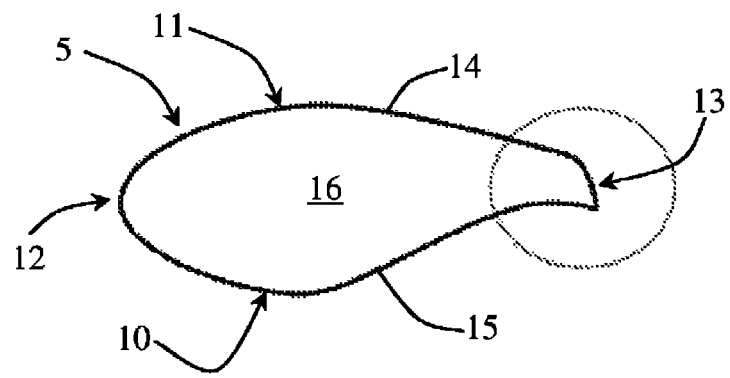
FIG. 2 shows an exemplary embodiment of a cross-sectional profile of a wind turbine blade.

FIG. 2 shows an exemplary embodiment of a cross-sectional profile of a wind turbine blade 5. The wind turbine blade 5 may comprise a pressure side 10 and a suction side 11 which are connected to each other by a leading edge 12 and a trailing edge 13. The wind turbine blade 5 may comprise a first shell part 14 and a second shell part 15 forming a plurality of cross-sectional profiles 16. The first shell part 14 may comprise an inner surface and an outer surface which also forms the outer surface of the suction side 11. The second shell part 15 may comprise an inner surface and an outer surface which also forms the outer surface of the pressure side 10.

The first shell part 14 may comprise a gluing surface (not shown) arranged at or near its leading edge. The second shell part 15 may comprise a gluing surface (not shown) arranged at or near its leading edge. The two gluing surfaces face each other and are configured to be brought into contact with each other when the two shell parts 14, 15 are placed on top of each other. The gluing surfaces form a glue line arranged at the inside of the two shell parts and are configured to be glued together using a glue.

Figure 3:
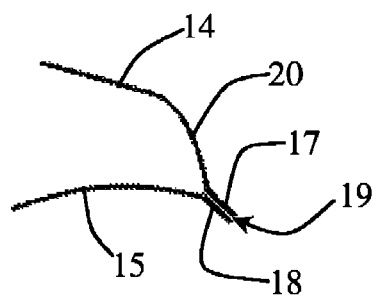
FIG. 3 shows an enlarged image of the trailing edge section shown in FIG. 2.

FIG. 3 shows an enlarged image of the trailing edge 13 of the wind turbine blade 5 shown in FIG. 2. A first flange 17 may be arranged at and connected to the trailing edge of the first shell part 14 and extend outwards away from the outer surface of the first shell part 14. The first flange 17 may comprise an inner surface facing a second flange 18 and an outer surface facing away from the second flange 18. The second flange 18 may be arranged at and connected to the trailing edge of the second shell part 15 and extends outwardly away from the outer surface of the second shell part 15. The second flange 18 may comprise an inner surface facing the first flange 17 and an outer surface facing away from the first flange 17. The inner surfaces of the flanges 17, 18 form two gluing surfaces for the two shell parts 14, 15 which are configured to be glued together using the glue when the two shell parts 14, 15 are placed on top of each other. The gluing surfaces form a gluing line 19 located outside an inner area defined by the inner surfaces of the two shell parts 14, 15, as shown in FIGS. 2 & 3.

A flat back panel 20 may be arranged between and connected to the outer surface of the first shell part 14 and the first flange 17. The flat back panel 20 may have a shape that rounds off the trailing edge 13 of the wind turbine blade 5, so that a virtual trailing edge is formed at the outer surface of the flat back panel 20. The flat back panel 20 is configured to function as a flat back or truncated trailing edge for the cross-sectional profiles 16.

The first flange 17 may be placed in an angle of 90° or more, preferably between 90° and 270°, relative to a tangent to the outer surface of the flat back panel 20 at their connection point. The flat back panel 20 may likewise be placed in an angle of 90° or more relative, preferably between 90° and 270°, relative to a tangent to the outer surface of the first shell part 14 at their connection point. The first flange 17 and/or flat back panel 20 may be manufactured in the same mold as the first shell part 14 so that the first flange 17 and/or the flat back panel 20 form part of the first shell part 14. The second flange 18 may be placed in an angle of 90° or more, preferably between 90° and 270°, relative to a tangent to the outer surface of the second shell part 15 at their connection point. The second flange 18 may be manufactured in the same mold as the second shell part 15 so that the second flange forms part of the second shell part 15.

Figure 4:
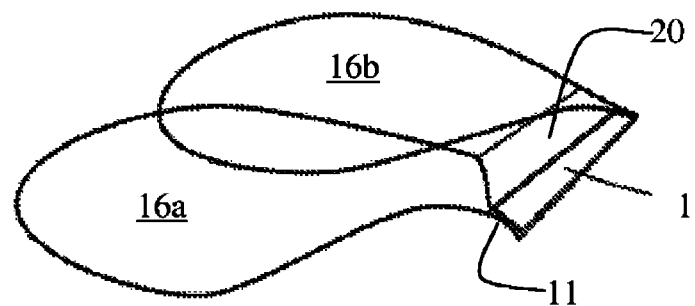
FIG. 4 shows a perspective view of the trailing edge shown in FIG. 3.

FIG. 4 shows a perspective view of the trailing edge 13 shown in FIG. 3 between a first cross-sectional profile 16a and a second cross-sectional profile 16b. The flat back panel 20 may extend from a first point (not shown) at or near the blade root 8 to a second point (not shown) located a distance from the tip end 9. The flanges 17, 18 may be processed, e.g., ground, into a desired shaped after the gluing process is completed. The flanges 17, 18 may be configured to function as a flap, e.g., a Gurney flap, and may have the same configuration along the entire length of the wind turbine blade 5. The width of the flap may be determined according the maximum chord of the cross-sectional profiles 16.

The flat back panel 20 may be shaped as a curved flange having a curved outer surface that curves outwardly away from the leading edge 13. The flat back panel 20 may be configured to form an outwardly extending edge between the flat back panel 20 and the outer surface of the first shell part 14 where the edge forms a rounded or smooth edge.

Figure 5:
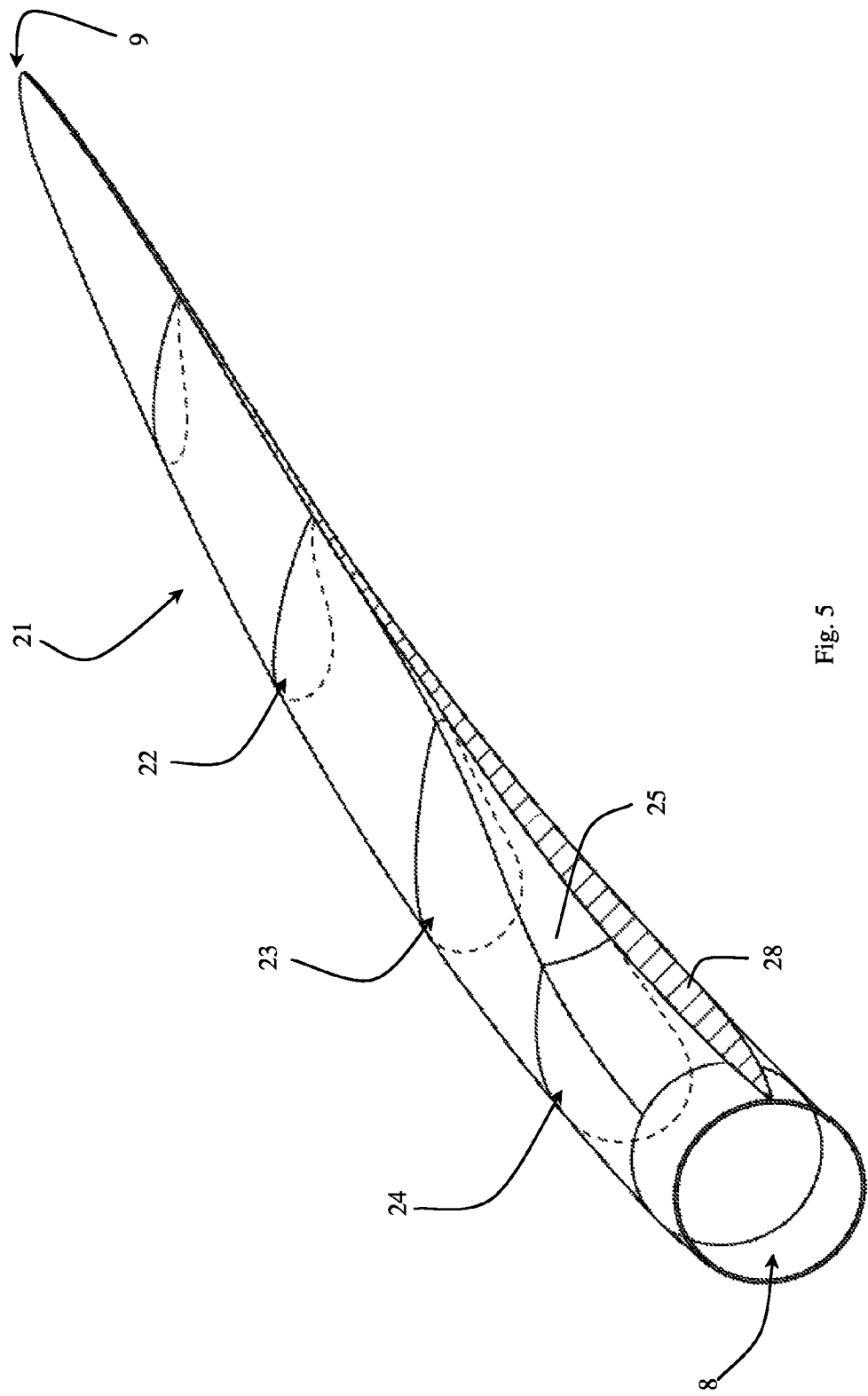
FIG. 5 shows a second exemplary embodiment of a wind turbine blade.

FIG. 5 shows a second exemplary embodiment of a wind turbine blade 21 configured to be mounted to the rotor hub 4. The wind turbine blade 21 may comprise a plurality of the cross-sectional profiles 22, 23, 24 arranged along the length of the blade, as shown in the figure. A flat back panel 25 may be arranged at the trailing edge 13 of the wind turbine blade 21 and may at one end be connected to a first shell part 26.

The flat back panel 25 may be connected at the other end to the first flange 17 which extends outwardly away from the outer surface of the flat back panel 25. The second flange 18 may be arranged at and connected to a trailing edge of a second shell part 27. The two flanges 17, 18 may each comprise a gluing surface facing each other which form a glue line 28.

The flat back panel 25 may at or near the blade root 8 have a radii curved outer surface curving outwards away from the leading edge 12. The outer surface of the flat back panel 25 at this point may follow the same curvature as at the blade root 8. The outer surface of the flat back panel 25 may then change into a radii curved outer surface curving inwards towards the leading edge 12 along at least a part of the length of the blade 21, as shown in the figure. The thickness or width of the flat back panel 25 may gradually decrease towards the tip end 9 until that point where the first flange 17 is connected to the first shell part 26.

Figure 6:
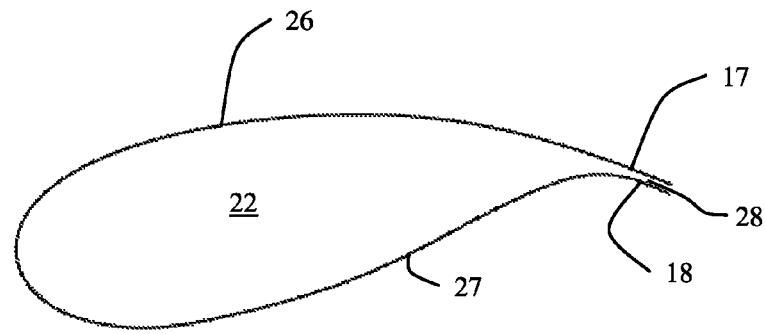
FIG. 6 shows a first cross-sectional profile of the wind turbine blade shown in FIG. 5.

FIG. 6 shows a first cross-sectional profile 22 of the wind turbine blade 21 shown in FIG. 5. In this profile 22, the first flange 17 may be connected to a first shell part 26, and the connection may form a smooth edge or continuous transition at the outer surface allowing a substantially laminar air flow over the edge. The second flange 18 may be connected to the second shell part 27 and may extend outwards and away from the outer surface of the second shell part 27. The connection between the second shell part 27 and the second flange 18 may at the outer surface form a smooth edge.

Figure 7:
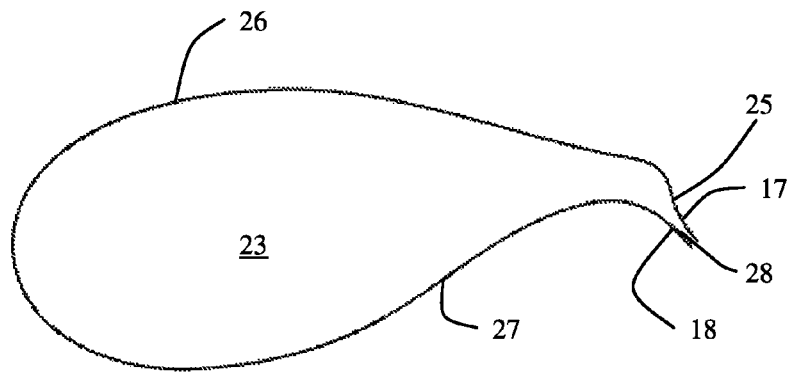
FIG. 7 shows a second cross-sectional profile of the wind turbine blade shown in FIG. 5.
Figure 8:
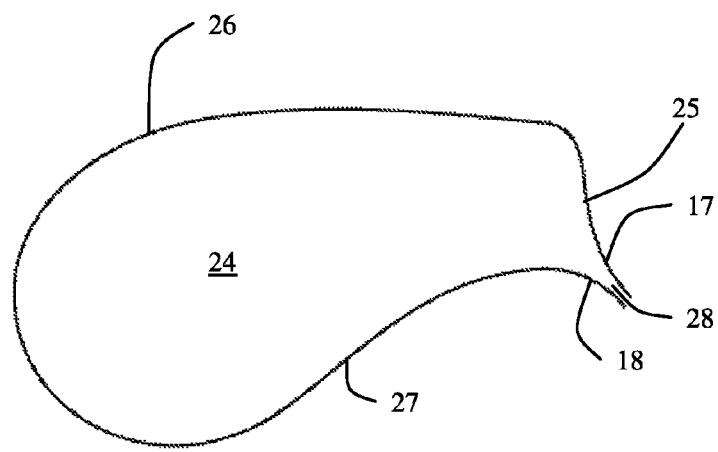
FIG. 8 shows a third cross-sectional profile of the wind turbine blade shown in FIG. 5.

FIG. 7 shows a second cross-sectional profile 23 of the wind turbine blade 21 shown in FIG. 5. In this profile, the flat back panel 25 may connect the first flange 17 with the first shell part 26. The flat back panel 25 may be configured as a flange having a curved outer surface curving inwards towards the leading edge 12. The curved flat back panel 25 may form a rounded or smooth edge between the outer surfaces of the first shell part 26 and the flat back panel 25. As thickness of the flat back panel 25 increases towards the blade root 8, the shape of the edge may change from the continuous transition, as shown in FIG. 6, to a smooth edge, as shown in FIG. 8. The flat back panel 25 may positioned relative to the first shell part, e.g., the inner surface, so that the tangent along the curvature of the flat back panel 25 is positioned at an angle of 90° or more relative to the inner surface of the first shell part 26 at the connection.

FIG. 8 shows a third cross-sectional profile 24 of the wind turbine blade 21 shown in FIG. 5. In this profile, the flat back panel 25 may have a thickness or width close to its maximum value. The radius or radii of the curvature along the length of the flat back panel 25 may be constant. The flat back panel 25 may be twisted towards the blade root 8 so that the curvature of the flat back panel 25 remains in a "positive angle" relative to the first shell part 26, as shown in the figure. The twist of the flat back panel may follow the twist of the wind turbine blade 21 from the tip end 9 towards the blade root 8.

What is claimed is:

1. A wind turbine (1) comprising:
    a wind turbine tower (2);
    a nacelle (3) provided on the wind turbine tower (2);
    a rotor hub (4) rotatably mounted to the nacelle (3);
    one or more wind turbine blades (5, 21) having a tip end (9) and a blade root (8), where the wind turbine blade (5, 21) further comprises a pressure side (10) and a suction side (11) connected to each other via a leading edge (12) and a trailing edge (13), wherein the wind turbine blade (5, 21) comprises a first shell part (14, 26) having an inner surface and an outer surface and a second shell part (15, 27) having an inner surface and an outer surface, where the first shell part (14, 26) comprises a first flange (17) having a first gluing surface, and the second shell part (15, 27) comprises a second flange having a second gluing surface facing the first gluing surface, and where the two gluing surfaces are configured to be glued together using a glue when the two shell parts (14, 15, 26, 27) are placed on top of each other, wherein:
    the first flange (17) is arranged at the trailing edge (13) of the first shell part (14, 26) and extends outwards and away from the outer surface of the first shell part (14, 26), and
    a second flange (18) is arranged at the trailing edge (13) of the second shell part (15, 27) and extends outwards and away from the outer surface of the second shell part (15, 27), wherein the two flanges (17, 18) form two substantially parallel gluing surfaces and a flap configured to enhance the aerodynamic properties of the wind turbine blade (5, 21), and
    wherein the first shell part comprises a flat back panel (20, 25) connected to each of the first flange (17) and the first shell part (14, 21).

2. A wind turbine according to claim 1, wherein the flat back panel (25) is configured as a flange having a radii curved outer surface curving inwards towards the leading edge (12).

3. A wind turbine according to claim 1, wherein the flat back panel (20) is configured as a flange having a radii curved outer surface curving outwards away from the leading edge (12).

4. A wind turbine according to claim 1, wherein the first flange (17) is placed in an angle of 90° or more relative to the tangent of one of the outer surface, the inner surface of the first shell part (14, 26) and the flat back panel (20, 25).

5. A wind turbine according to claim 4, wherein the flat back panel (20, 25) is placed in an angle of 90° or more relative to the tangent of the outer surface or inner surface of the first shell part (14, 26).

6. A wind turbine according to claim 1, wherein the second flange (18) is placed in an angle of 90° or more relative to a tangent of the outer surface of the second shell part (15, 27).

7. A wind turbine according to claim 1, wherein the flanges are connected by a glue.

8. A wind turbine according to claim 1, wherein a third gluing surface and a fourth gluing surface are arranged at or near the leading edge (12) on the first and second shell parts (14, 15, 26, 27) respectively.

9. A wind turbine according to claim 1, wherein the first and second flanges (17, 18) have a width of 2-10% relative to a chord of the wind turbine blade (5, 21).

10. A wind turbine according to claim 1, wherein the first and second flanges have a width of 5% relative to a chord of the wind turbine blade.

* * * * *